(12) United States Patent
Handley et al.

(10) Patent No.: US 8,180,665 B2
(45) Date of Patent: May 15, 2012

(54) SYSTEMS AND METHODS FOR ANALYZING PERFORMANCE OF A PRINT DEVICE IN A MANAGED PRINT SERVICE

(75) Inventors: John C. Handley, Fairport, NY (US); Yasin Alan, Ithaca, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 321 days.

(21) Appl. No.: 12/697,836

(22) Filed: Feb. 1, 2010

(65) Prior Publication Data
US 2011/0191144 A1    Aug. 4, 2011

(51) Int. Cl.
G06Q 10/00    (2012.01)
G06Q 30/00    (2012.01)
G06F 17/00    (2006.01)
G06G 7/00    (2006.01)

(52) U.S. Cl. ...................... 705/7.35; 705/400

(58) Field of Classification Search ........................ None
See application file for complete search history.

(56) References Cited

U.S. PATENT DOCUMENTS

| | | | |
|---|---|---|---|
| 2006/0206445 A1* | 9/2006 | Andreoli et al. | 706/52 |
| 2010/0005038 A1* | 1/2010 | Nagarajan et al. | 705/400 |
| 2011/0194768 A1 | 8/2011 | Handley et al. | |
| 2011/0225022 A1 | 9/2011 | Handley et al. | |

* cited by examiner

Primary Examiner — John Hayes
Assistant Examiner — George Chen
(74) Attorney, Agent, or Firm — Fox Rothschild LLP

(57) ABSTRACT

A managed print system for analyzing performance of a print device may include a computing device and a computer-readable storage medium in communication with the computing device. The computer-readable storage medium may include one or more programming instructions for receiving a black and white print volume variable associated with a print device, receiving a color print volume variable associated with the print device, determining a black and white cost variable associated with the black and white print volume variable and determining a color cost variable associated with the color print volume variable, determining a standard relationship, determining an empirical relationship, determining, based on the empirical relationship, whether the print device has a poor fit to the standard relationship, and in response to the print device having a poor fit to the standard relationship, determining which of the variables influenced the poor fit.

17 Claims, 5 Drawing Sheets

SYSTEMS AND METHODS FOR ANALYZING PERFORMANCE OF A PRINT DEVICE IN A MANAGED PRINT SERVICE

BACKGROUND

A managed print service often includes operations that are managed by a second party on behalf of an enterprise. As a form of outsourcing, it allows the enterprise to focus on its core business. Printing, for example, can be viewed as a core infrastructure along with information management and technology.

SUMMARY

This invention is not limited to the particular systems, methodologies or protocols described, as these may vary. The terminology in this document is for the purpose of describing particular embodiments only, and is not intended to limit the scope of the present disclosure which will be limited only by the appended claims.

As used in this document, the singular forms "a," "an," and "the" include plural reference unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a managed print system for analyzing performance of a print device may include a computing device and a computer-readable storage medium in communication with the computing device. The computer-readable storage medium may include one or more programming instructions for receiving a black and white print volume variable associated with a print device, receiving a color print volume variable associated with the print device, determining a black and white cost variable associated with the black and white print volume variable and determining a color cost variable associated with the color print volume variable. The computer-readable storage medium may include determining a standard relationship between at least the black and white print volume variable, the color print volume variable, the black and white cost variable and the color cost variable, determining an empirical relationship between at least the black and white print volume variable, the color print volume variable, the black and white cost variable and the color cost variable, determining, based on the empirical relationship, whether the print device has a poor fit to the standard relationship and in response to the print device having a poor fit to the standard relationship, determining which of the variables influenced the poor fit.

In an embodiment, a method of analyzing performance of a print device may include receiving, by a computing device, a black and white print volume variable associated with a print device and a color print volume variable associated with the print device, determining a black and white cost variable associated with the black and white print volume variable, determining a color cost variable associated with the color print volume variable, determining, by the computing device, a standard relationship between at least the black and white print volume variable, the color print volume variable, the black and white cost variable and the color cost variable, and determining, by the computing device, an empirical relationship between at least the black and white print volume variable, the color print volume variable, the black and white cost variable and the color cost variable. The method may include determining, based on the empirical relationship, whether the print device has a poor fit to the standard relationship, in response to the print device having a poor fit to the standard relationship, determining, by the computing device, which of the variables influenced the poor fit and generating, by the computing device, a report comprising one or more of the following: an indication of whether the print device has a poor fit to the standard relationship, an indication of which variable influenced the poor fit, the black and white print volume variable, the color print volume variable, the black and white cost variable, and the color cost variable.

DETAILED DESCRIPTION

For purposes of the discussion below, a "print device" refers to a device capable of performing one or more functions, operations and/or services on a print job. For example, a print device may provide print-related services for one or more print jobs. A print device may include a printer, a cutter, a collator, a scanner, a fax machine, a multi-function device or other similar equipment.

An "enterprise" refers to an entity that includes a plurality of print devices. An enterprise may be a freestanding entity or it may be part of a corporation or other entity. Additionally, an enterprise may communicate with one or more servers by way of a local area network or a wide area network, such as the Internet, the World Wide Web or the like.

A "job" refers to a logical unit of work that is to be completed for a customer. In a print environment, a job may include one or more print jobs from one or more clients. A print environment may include a plurality of jobs.

A "print job" refers to a job processed in a print environment. For example, a print job may include printing a document, scanning a document and/or the like.

A "print-related service" refers to a function, operation and/or service that is performed on a print job. For example, copying, scanning, collating and binding are exemplary print-related services.

Figure 1:
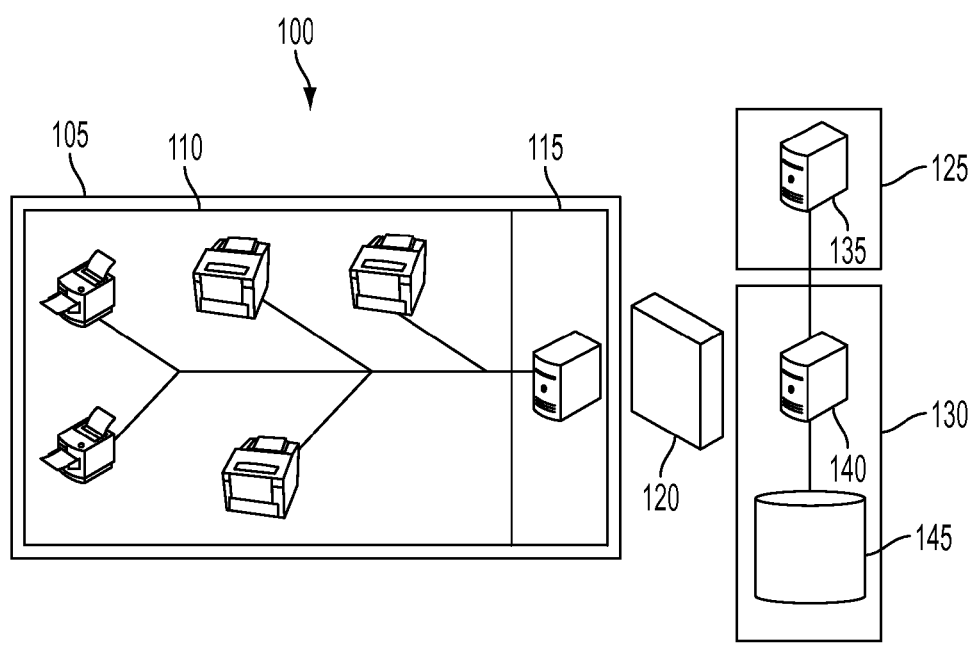
FIG. 1 illustrates an exemplary managed print-service architecture according to an embodiment.

FIG. 1 illustrates an exemplary managed print-service architecture according to an embodiment. As illustrated by FIG. 1, the architecture 100 may include one or more customer enterprises 105. A customer enterprise 105 may include or more print devices 110 that may communicate with one or more computing devices 115, such as a server. In an embodiment, the one or more computing devices 115 may be located within the enterprise. Alternatively, the one or more computing devices 115 may be located remote from the enterprise 105.

In an embodiment, the architecture 100 may include a communications firewall 120, a management service 125 and/or a data warehouse 130. In an embodiment, the management service 125 may include one or more computing devices 135 that communicate with the data warehouse 130.

The data warehouse 130 may include one or more computing devices 140 and/or one or more computer-readable storage media 145. In an embodiment, the management service 125 and/or the data warehouse 130 may communicate with a customer enterprise 105. For example, a computing device 135 in the management service 125 may communicate with one or more computing devices 115 within the enterprise 105, print devices 110 within the enterprise and/or the like. Similarly, a computing device 140 within the data warehouse 130 may communicate with one or more computing devices 115 within the enterprise 105, print devices 110 within the enterprise and/or the like.

Figure 2:
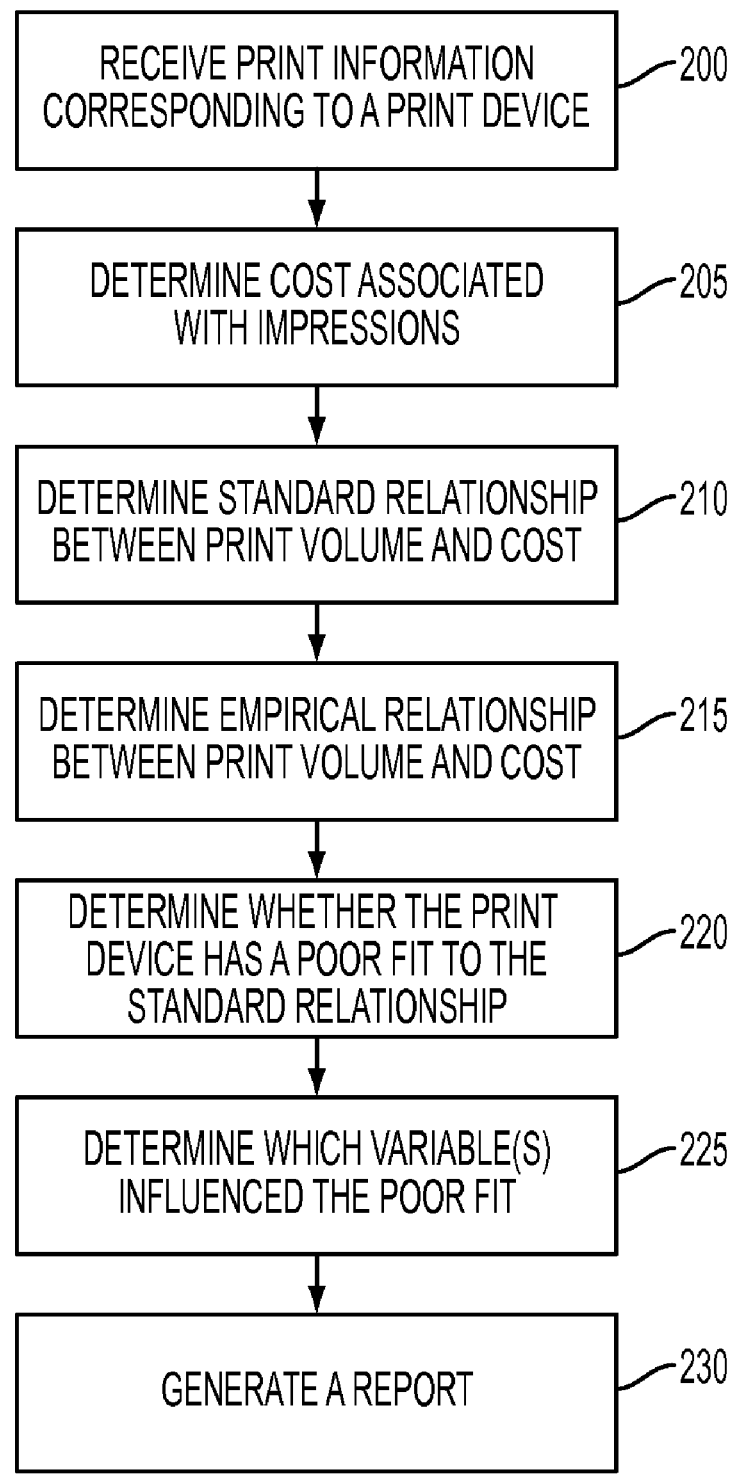
FIG. 2 illustrates an exemplary method of analyzing print metrics according to an embodiment.

FIG. 2 illustrates an exemplary method of analyzing print metrics according to an embodiment. As illustrated by FIG. 2, one or more computing devices in the data warehouse may receive 200 print information from a customer enterprise. The received information may be stored in the data warehouse. In an embodiment, a user of the management service, such as an account manager, may use this information to manage a customer's account, generate invoices and/or perform other tasks.

In an embodiment, print information may include a color print volume, a black and white ("BW") print volume, a combined color and BW print volume and/or the like. In an embodiment, print information may include print volumes processed by one or more print devices within an enterprise, a total print volume processed by an enterprise and/or the like.

In an embodiment, a print volume may be a cumulative count of impressions over a period of time. An impression may be text, images and/or other content that is printed on a single side of a substrate, such as paper. For example, printing on both sides of a sheet of paper may encompass two impressions. In an embodiment, a print volume may be the number of impressions processed by an enterprise on a certain day. Additional and/or alternate print volumes may be used within the scope of this disclosure. For example, a color print volume may be the number of color impressions processed by an enterprise over a period of time, such as a day. Likewise, a BW print volume may be the number of BW impressions processed by an enterprise over a period of time, such as a day. In an embodiment, a management service may be used to collect and analyze print volumes associated with one or more enterprises.

In an embodiment, utility of BW and color print volumes may be a function of the demand associated with each. Demand may be the amount of BW and/or color prints that are purchased, used and/or the like. For example, in a managed print system, demand may be the number of BW impressions, the number of color impressions and/or the like.

In an embodiment, utility may be represented using a Cobb-Douglas function such as the following:

$$U(x_B, x_C) = (x_B)^\alpha (x_C)^{1-\alpha}$$

where
$0 < \alpha < 1$,
$X_B$ is the number of BW impressions, and
$X_C$ is the number of color impressions.

In an embodiment, the utility function may be a hyperbolic function that may describe the tradeoff in value between BW print demand and color print demand.

In an embodiment, a cost associated with BW and/or color impressions may be determined 205. In an embodiment, the prices associated with the BW and/or color impressions may vary based on printing device, account and/or the like.

In an embodiment, an upper bound on the cost associated with the demand may exist. For example, an upper bound may represent the total cost a customer is willing to pay for BW and color printing in an enterprise. In an embodiment, printing behavior may be modeled as maximizing utility subject to an upper bound by the following:

$$\max(x_B)^\alpha (x_C)^{1-\alpha}, \text{ such that } p_B x_B + p_C x_C \leq w,$$

where
w=upper bound,
$p_C$ is the price per color impression, and
$p_B$ is the price per BW impression.

The solution to the model described above may be represented as the following:

$$x_B = \alpha \left(\frac{w}{p_B}\right) \text{ and } x_C = \left(\frac{(1-\alpha)w}{p_C}\right)$$

In an embodiment, $\alpha$ may be estimated using regression. For example, a population of print devices of a certain model having average monthly print volumes over a threshold of 1,000 may be considered according to an embodiment. Each such print device may have an average BW and color print volume represented by $((x_B)_i, (x_C)_i), i=1, \ldots, l$. In an embodiment, corresponding empirical ratios may be represented by $$r_i = \frac{(x_B)_i}{(x_C)_i}.$$

In an embodiment, the prices associated with the BW and color impressions may vary based on printing device, account and/or the like. As such, the prices may be represented by $((p_B)_i, (p_C)_i), i=1, \ldots, l$. In an embodiment, actual print volume ratios and theoretical volumes as a function of price and utility may be compared to estimate $\alpha$. In an embodiment, $\alpha$ may be estimated using a least squares formulation:

$$\hat{\alpha} = \operatorname{argmin} \sum_{i=1}^{l} \left(r_i - \frac{\alpha}{1-\alpha} \frac{(p_C)_i}{(p_B)_i}\right)^2,$$

which has a closed solution of:

$$\hat{\alpha} = \frac{\sum_{i=1}^{l} \frac{(x_B)_i}{(x_C)_i} \frac{(p_C)_i}{(p_B)_i}}{\sum_{i=1}^{l} \left(\frac{(x_B)_i}{(x_C)_i} + \frac{(p_C)_i}{(p_B)_i}\right) \frac{(p_C)_i}{(p_B)_i}}$$

In an embodiment, a robust regression method may be used to present this problem as a linear regression:

$$r_i = \beta z_i + \varepsilon_i, \text{ where } z_i = \frac{(p_C)_i}{(p_B)_i} \text{ and } \beta = \frac{\alpha}{(1-\alpha)}.$$

In an embodiment, a standard relationship may be determined 210 between the print volume and cost associated with color and BW prints for a print device in an enterprise. In an embodiment, a standard relationship may provide an indication as to whether color value is being captured in the current price structure. In an embodiment, a standard relationship may be represented by:

$$\frac{x_B}{x_c} = \frac{\alpha}{1-\alpha} \frac{p_c}{p_B}$$

In an embodiment, a standard relationship, such as that described above, may describe the underlying behavior of print volume versus price. However, individual enterprises and/or customer accounts may include one or more print devices that deviate from the standard relationship. In an embodiment, these print devices may be examined to identify, for example, whether one or more print prices need to be adjusted.

In an embodiment, an empirical relationship may be determined 215 between print volume and price for one or more of BW impressions, color impressions and/or the like. For example, an empirical relationship may be represented by:

$$\hat{\beta} = \underset{\beta}{\operatorname{argmin}} \underset{i=1,\ldots,J}{\operatorname{median}} \left( r_i - \beta \frac{(p_C)_i}{(p_B)_i} \right)^2, \text{ and } \hat{\alpha} = \frac{\hat{\beta}}{(1+\hat{\beta})}$$

In an embodiment, the standard and the empirical relationships may be compared to determine 220 whether a print device has a poor fit to the standard relationship. A poor fit is a deviation of the empirical relationship from the standard relationship that exceeds a threshold value. In an embodiment, a print device that has a poor fit to its associated standard relationship may be considered to be poorly used or poorly priced as compared to other print devices.

In an embodiment, a residual value may be determined for a print device. A residual value, $\epsilon_i$, may be represented by the following equation:

$$\varepsilon_i = r_i - \frac{\hat{\alpha}}{1-\hat{\alpha}} \frac{(p_C)_i}{(p_B)_i}$$

In an embodiment, residual values may be determined for one or more other print devices. For example, residual values may be determined for one or more other print devices having the same model number or other identifying characteristic. The residual values may be compared to identify whether the residual value associated with the print device is an outlier. An outlier is a data point having a deviation from a function that is greater than a predetermined deviation. In an embodiment, an outlier may be a data point whose value is distant from other data point values in a population.

Figure 3:
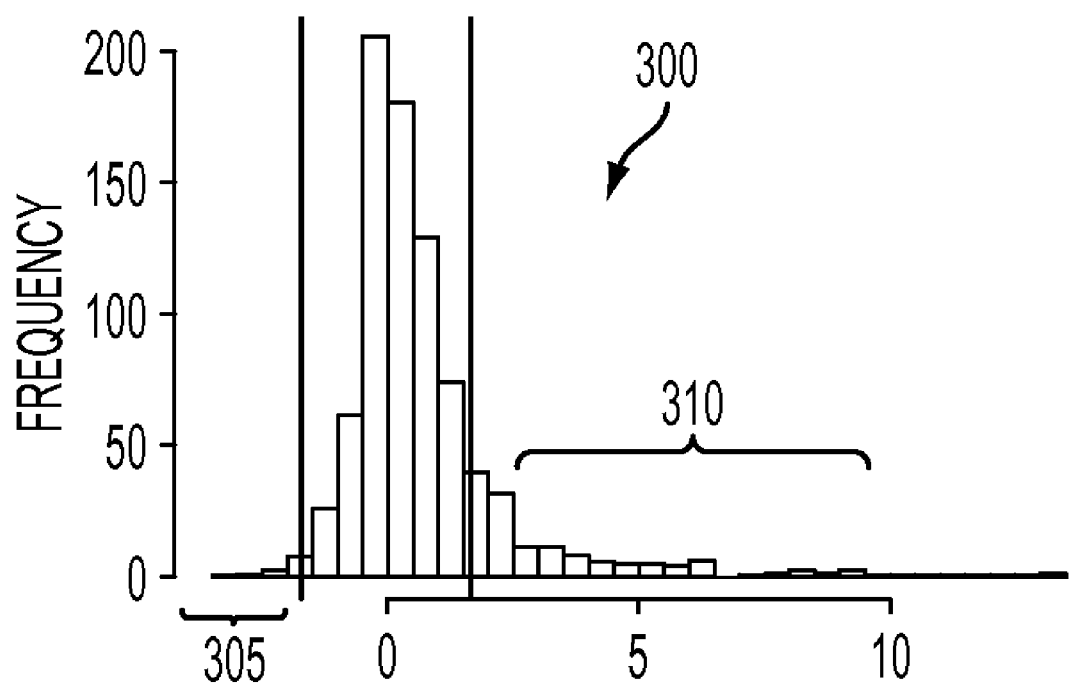
FIG. 3 illustrates a histogram for exemplary residuals according to an embodiment.

FIG. 3 illustrates a histogram for exemplary residuals for a plurality of print devices in an enterprise having $\alpha$=0.18. As illustrated by FIG. 3, the distribution 300 is skewed and contains two sets of outliers 305, 310. In an embodiment, approximate 95% limits may be computed using +/−2 times the median absolute deviation. Additional and/or alternate limits and/or median absolute deviations may be used within the scope of this disclosure.

Figure 4:
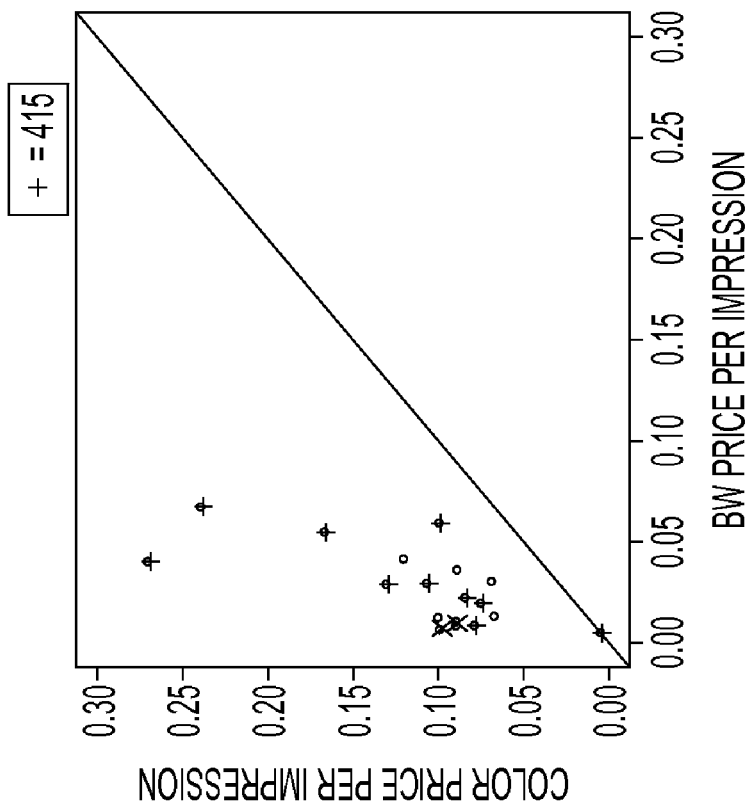
FIG. 4 illustrates an exemplary scatter plot according to an embodiment.
Figure 4:
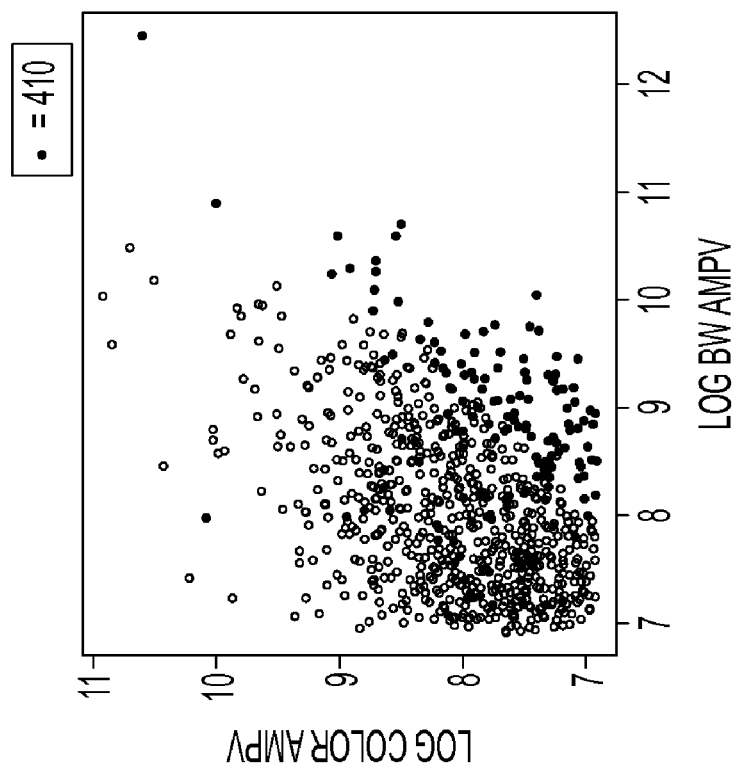

In an embodiment, if the residual value associated with the print device is an outlier, one or more of the BW print volume, color volume, BW price and/or color price variable may be examined to determine 225 which variable, or combination of variables, influenced the print device's poor fit to the standard relationship. For example, FIG. 4 illustrates a scatter plot 400 of values by the logarithm of the average monthly print volumes (AMPV) for BW versus color and a scatter plot 405 of values for price/impression of BW versus color for the residuals illustrated in FIG. 3. As illustrated in FIG. 4, print devices 410 associated with the first set of outliers 305 may have a low BW price compared to the population. As such, the utility for these print devices may not be maximized because the BW prices are too low.

In comparison, print devices 415 associated with the second set of outliers 310 may have a high BW to color impression ratio as compared to price, and therefore may have exceptionally high BW volume as compared to color volume. However, customers of these print devices may be paying the same rate as the rest of the population. As such, these print devices may not be getting an equivalent return on their color investment as the rest of the population having the same or equivalent print device.

In an embodiment, a report may be generated 230. The report may include information associated with one or more print devices identified as having a poor fit to the standard relationship. For example, the report may include BW print volume, color print volume, BW price and/or color price associated with the print device. The report may also include an indication of which of these variables influenced the poor fit. Additional and/or alternate information associated with the print device may be included within the scope of the present disclosure.

Figure 5:
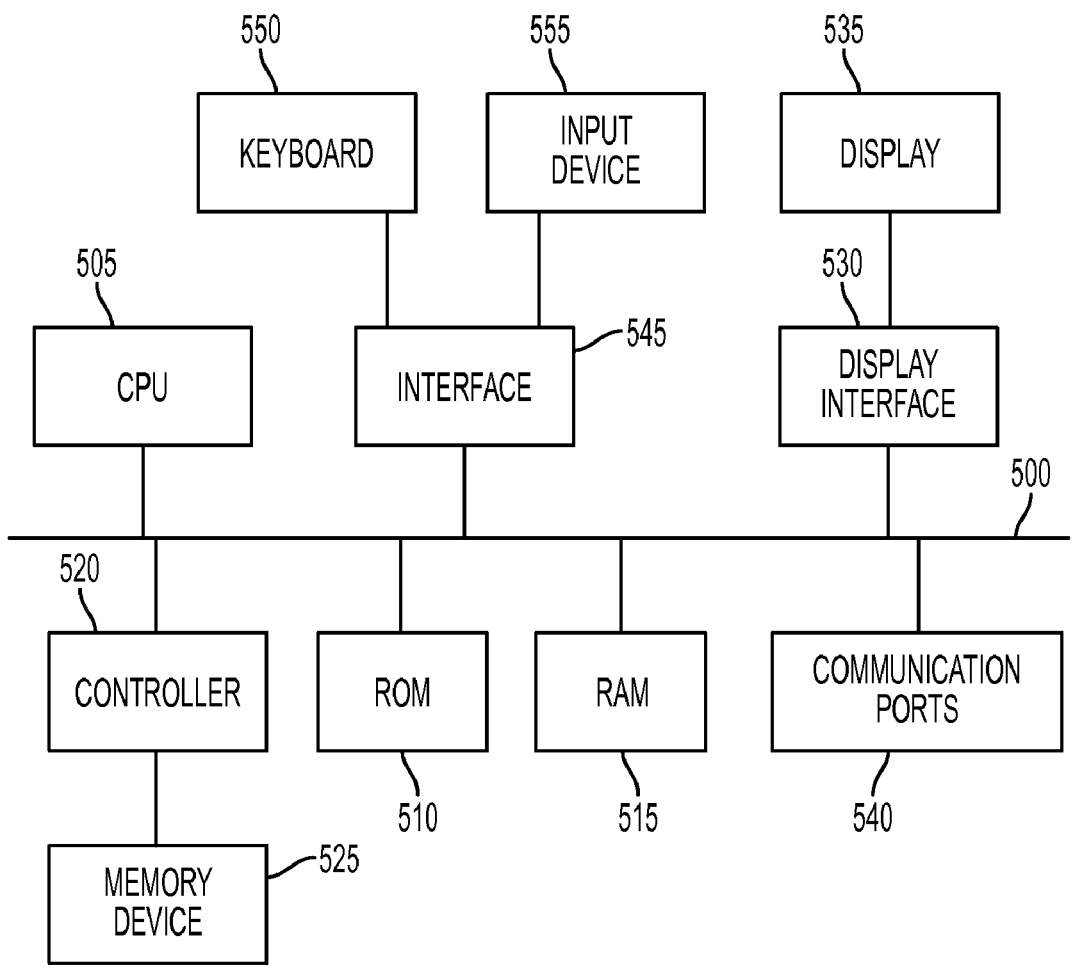
FIG. 5 depicts a block diagram of exemplary internal hardware that may be used to contain or implement program instructions according to an embodiment.

FIG. 5 depicts a block diagram of exemplary internal hardware that may be used to contain or implement program instructions according to an embodiment. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions may be stored in the ROM 510 and/or the RAM 515. Optionally, program instructions may be stored on a tangible computer readable storage medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

Various of the above-disclosed and other features and functions, or alternatives thereof, may be combined into many other different systems or applications. Various presently unforeseen or unanticipated alternatives, modifications, variations or improvements therein may be subsequently

What is claimed is:

1. A managed print system for analyzing performance of a print device, the system comprising:
   a computing device; and
   a computer-readable storage medium in communication with the computing device, the computer-readable storage medium comprising one or more programming instructions for:
   receiving a black and white print volume variable associated with a print device,
   receiving a color print volume variable associated with the print device, determining a black and white cost variable associated with the black and white print volume variable,
   determining a color cost variable associated with the color print volume variable,
   determining a standard relationship among at least the black and white print volume variable, the color print volume variable, the black and white cost variable and the color cost variable,
   determining an empirical relationship among at least the black and white print volume variable, the color print volume variable, the black and white cost variable and the color cost variable,
   determining, based on the empirical relationship, whether the print device has a poor fit to the standard relationship; wherein a poor fit is a deviation of the empirical relationship from the standard relationship that exceeds a threshold value; and
   in response to the print device having a poor fit to the standard relationship, determining which of the variables influenced the poor fit.

2. The system of claim 1, wherein the one or more programming instructions for determining whether the print device has a poor fit to the standard relationship comprise one or more programming instructions for:
   determining a first residual value associated with the print device;
   determining a second residual value for each of a plurality of other print devices associated with a same model number as the print device;
   comparing the first residual value and the second residual values to determine whether the first residual value is an outlier.

3. The system of claim 2, wherein the one or more programming instructions for determining which of the variables influenced the poor fit comprise one or more programming instructions for, in response to determining that the first residual value is an outlier, performing one or more of the following to determine which of the variables influenced the poor fit:
   comparing the black and white print volume variable to black and white print volume variables associated with the plurality of other print devices to determine whether the black and white print volume variable is exceptional;
   comparing the color print volume variable to color print volume variables associated with the plurality of other print devices to determine whether the color print volume variable is exceptional;
   comparing the black and white cost variable to black and white cost variables associated with the plurality of other print devices to determine whether the black and white cost variable is exceptional; and
   comparing the color cost variable to other cost variables associated with the plurality of other print devices to determine whether the color cost variable is exceptional.

4. The system of claim 1, wherein the one or more programming instructions for receiving a black and white print volume variable comprise one or more programming instructions for receiving the black and white print volume variable from the print device.

5. The system of claim 1, wherein the one or more programming instructions for receiving a color print volume variable comprise one or more programming instructions for receiving the color print volume variable from the print device.

6. The system of claim 1, wherein the one or more programming instructions for determining a black and white cost variable comprise one or more programming instructions for receiving the black and white cost variable from a data warehouse, wherein the black and white cost variable is based on one or more of the following:
   a customer account,
   the print device, and
   a model associated with the print device.

7. The system of claim 1, wherein the one or more programming instructions for determining a color cost variable comprise one or more programming instructions for receiving the color cost variable from a data warehouse, wherein the color cost variable is based on one or more of the following:
   a customer account,
   the print device, and
   a model associated with the print device.

8. The system of claim 1, wherein the one or more programming instructions for determining a standard relationship comprise one or more programming instructions for determining a standard relationship describing a relationship between one or more of the black and white print volume variable and the color volume variable and one or more of the black and white cost variable and the color cost variable.

9. The system of claim 1, wherein the one or more programming instructions further comprise one or more programming instructions for generating a report comprising one or more of the following:
   an indication of whether the print device has a poor fit to the standard relationship;
   an indication of which variable influenced the poor fit;
   the black and white print volume variable;
   the color print volume variable;
   the black and white cost variable; and
   the color cost variable.

10. A method of analyzing performance of a print device, the method comprising:
    receiving, by a computing device, a black and white print volume variable associated with a print device and a color print volume variable associated with the print device,
    determining a black and white cost variable associated with the black and white print volume variable,
    determining a color cost variable associated with the color print volume variable,
    determining, by the computing device, a standard relationship among at least the black and white print volume variable, the color print volume variable, the black and white cost variable and the color cost variable,
    determining, by the computing device, an empirical relationship among at least the black and white print volume variable, the color print volume variable, the black and white cost variable and the color cost variable, determining, based on the empirical relationship, whether the print device has a poor fit to the standard relationship; wherein a poor fit is a deviation of the empirical relationship from the standard relationship that exceeds a threshold value;

in response to the print device having a poor fit to the standard relationship, determining, by the computing device, which of the variables influenced the poor fit; and generating, by the computing device, a report comprising one or more of the following:

an indication of whether the print device has a poor fit to the standard relationship, an indication of which variable influenced the poor fit, the black and white print volume variable, the color print volume variable, the black and white cost variable, and the color cost variable.

11. The method of claim 10, wherein determining a standard relationship comprises determining a standard relationship describing a relationship between one or more of the black and white print volume variable and the color volume variable and one or more of the black and white cost variable and the color cost variable.

12. The method of claim 10, wherein determining whether the print device has a poor fit to the standard relationship comprises:

determining a first residual value associated with the print device;

determining a second residual value for each of a plurality of other print devices associated with a same model number as the print device; and comparing the first residual value and the second residual values to determine whether the first residual value is an outlier.

13. The method of claim 12, wherein determining which variable influenced the poor fit comprises, in response to determining that the first residual value is an outlier, performing one or more of the following to determine which variable influenced the poor fit:

comparing the black and white print volume variable to black and white print volume variables associated with the plurality of other print devices to determine whether the black and white print volume variable is exceptional;

comparing the color print volume variable to color print volume variables associated with the plurality of other print devices to determine whether the color print volume variable is exceptional;

comparing the black and white cost variable to black and white cost variables associated with the plurality of other print devices to determine whether the black and white cost variable is exceptional; and comparing the color cost variable to color cost variables associated with the plurality of other print devices to determine whether the color cost variable is exceptional.

14. The method of claim 10, wherein receiving a black and white print volume variable comprises receiving the black and white print volume variable from the print device.

15. The method of claim 10, wherein receiving a color print volume variable comprises receiving the color print volume variable from the print device.

16. The method of claim 10, wherein determining a black and white cost variable comprises receiving the black and white cost variable from a data warehouse, wherein the black and white cost variable is based on one or more of the following:

a customer account, the print device, and a model associated with the print device.

17. The method of claim 10, wherein determining a color cost variable comprises receiving the color cost variable from a data warehouse, wherein the color cost variable is based on one or more of the following:

a customer account, the print device, and a model associated with the print device.

* * * * *